US012306937B1

(12) United States Patent
Siu et al.

(10) Patent No.: US 12,306,937 B1
(45) Date of Patent: May 20, 2025

(54) DEVICES, SYSTEMS, AND METHODS FOR RANSOMWARE PROTECTION AND MITIGATION

(71) Applicants: Oceanit Laboratories, Inc., Honolulu, HI (US); The Regents of the University of Michigan, Ann Arbor, MI (US)

(72) Inventors: David Siu, Honolulu, HI (US); J. Alex Halderman, Ann Arbor, MI (US); Max Froehlich, Ann Arbor, MI (US); Steven Sprecher, Boston, MA (US); Ky Ho, Honolulu, HI (US); Wen Plotnick, Ann Arbor, MI (US)

(73) Assignees: Oceanit Laboratories, Inc., Honolulu, HI (US); The Regents of the University of Michigan, Ann Arbor, MI (US)

( * ) Notice: Subject to any disclaimer, the term of this patent is extended or adjusted under 35 U.S.C. 154(b) by 269 days.

(21) Appl. No.: 17/963,817

(22) Filed: Oct. 11, 2022

Related U.S. Application Data

(60) Provisional application No. 63/254,485, filed on Oct. 11, 2021.

(51) Int. Cl.
*G06F 21/55* (2013.01)
*G06F 21/56* (2013.01)

(52) U.S. Cl.
CPC .......... *G06F 21/554* (2013.01); *G06F 21/565* (2013.01); *G06F 21/566* (2013.01); *G06F 2221/034* (2013.01)

(58) Field of Classification Search
CPC ..... G06F 21/554; G06F 21/566; G06F 21/565
See application file for complete search history.

(56) References Cited

U.S. PATENT DOCUMENTS 10,282,117 B2   5/2019   Benkert et al.
10,437,983 B1   10/2019  Fessel
(Continued)

OTHER PUBLICATIONS

Wang, Peiying, et al., "MimosaFTL: Adding Secure and Practical Ransomware Defense Strategy to Flash Translation Layer," Proceedings of the Ninth ACM Conference on Data and Application Security and Privacy, ACM, 2019.
Kharaz, Amin, et al., "{Unveil}: A Large-Scale, Automated Approach to Detecting Ransomware," 25th {USENIX} Security Symposium ({USENIX} Security 16), 2016.
Grégio, André Ricardo Abed, et al., "Toward a Taxonomy of Malware Behaviors," The Computer Journal 58.10 (2015): 2758-2777.
(Continued)

*Primary Examiner* — Hee Soo Kim
(74) *Attorney, Agent, or Firm* — Fresh IP PLC; Clifford D. Hyra; Aubrey Y Chen

(57) ABSTRACT

Disclosed herein are devices, systems, and methods for detecting, mitigating, and protecting against malicious actions and/or malicious computer software, including malware and ransomware. Specifically, disclosed embodiments mitigate the threat of ransomware across a wide range of devices including, for example, servers, storage systems, computers, and portable storage devices. At least one embodiment stealthily detects malicious actions by interposing when a file is opened for writing, creating a temporary checkpoint, comparing existing data in the file to what will be written to determine if it is destructive, and, if the behavior is malicious and/or destructive, preserving the checkpoint. At least a further embodiment can be implemented on, and/or ported in, a portable storage device (e.g., a USB device).

19 Claims, 17 Drawing Sheets

(56) References Cited

U.S. PATENT DOCUMENTS

| | | |
|---|---|---|
| 10,521,611 B2 | 12/2019 | Benkert et al. |
| 11,175,851 B2 | 11/2021 | Fessel |
| 11,182,086 B2 | 11/2021 | Fessel |
| 2018/0302418 A1 | 10/2018 | Scasny |
| 2020/0099699 A1* | 3/2020 | Saad .................... G06F 11/2076 |
| 2021/0019403 A1* | 1/2021 | Mehta ..................... G06F 21/56 |
| 2021/0150025 A1* | 5/2021 | Ben-Shalom .......... G06F 21/554 |
| 2022/0083657 A1* | 3/2022 | Karr ....................... G06F 11/108 |
| 2022/0172792 A1 | 6/2022 | Fessel |
| 2023/0306108 A1* | 9/2023 | Veprinsky ............. G06F 21/552 |
| 2023/0367876 A1* | 11/2023 | Algieri .................. G06F 21/561 |
| 2024/0143764 A1* | 5/2024 | Yim ....................... G06F 21/567 |
| 2024/0273190 A1* | 8/2024 | Shachar ................ G06F 21/566 |

OTHER PUBLICATIONS

D. Kifer et al., "Detecting Change in Data Streams," Proceedings of the Thirtieth International Conference on Very Large Data Bases, vol. 30, Toronto, Canada: VLDB Endowment, pp. 180-191 (2004) (isbn: 0120884690).

Bates, Adam M., et al., "Leveraging USB to Establish Host Identity Using Commodity Devices," NDSS, 2014.

Gary Kessler, "GCK's File Signatures Table," garykessler.net, Jun. 1, 2021.

Baek et al., "SSD-Assisted Ransomware Detection and Data Recovery Techniques," IEEE Transactions on Computers, vol. 70, No. 10, Oct. 2021.

* cited by examiner

450

Algorithm 1 FIND_CHANGE

```
for i ∈ {1, ···, k} do
    c₀ ← 0
    Window₁,ᵢ ← first m₁,ᵢ points from time c₀
    Window₂,ᵢ ← first m₂,ᵢ points from in stream
end for
while not at end of stream do
    for i ∈ {1, ···, k} do
        Slide Window₂,ᵢ by 1 point
        if d(Window₁,ᵢ, Window₂,ᵢ) ≥ αᵢ then
            c₀ ← current time
            Report change at time c₀
            Clear all windows and go to step 1
        end if
    end for
end while
```

| 0 | Features 00h | command ECh | C R R R 1 0 0 0 | PM Port 0h | FIS Type (27h) |
|---|---|---|---|---|---|
| 1 | Device A0h | LBA High 00h | | LBA Mid 00h | LBA Low 00h |
| 2 | Features (exp) 00h | LBA High (exp) 00h | | LBA Mid (exp) 00h | LBA Low (exp) 00h |
| 3 | Control 00h | Reserved (0) | | Sector Count (exp) 00h | Sector Count 00h |
| 4 | Reserved (0) | Reserved (0) | | Reserved (0) | Reserved (0) |

FIG. 8A

| 0 | Features 00h | command 35h | C\|R\|R\|R 1\|0\|0\|0 | PM Port 0h | FIS Type (27h) |
|---|---|---|---|---|---|
| 1 | Device E0h | LBA High LBA[23:16] | | LBA Mid LBA[15:8] | LBA Low LBA[7:0] |
| 2 | Features(exp) 00h | LBA High(exp) LBA[47:40] | | LBA Mid(exp) LBA[39:32] | LBA Low(exp) LBA[31:24] |
| 3 | Control 00h | Reserved(0) | | sector Count(exp) sector_count[15:8] | Sector Count sector_count[7:0] |
| 4 | Reserved(0) | Reserved(0) | | Reserved(0) | Reserved(0) |

850

DEVICES, SYSTEMS, AND METHODS FOR RANSOMWARE PROTECTION AND MITIGATION

CROSS-REFERENCE TO RELATED APPLICATION

This application claims priority to U.S. Provisional Application No. 63/254,485, filed Oct. 11, 2021, which is hereby incorporated by reference in its entirety.

STATEMENT REGARDING FEDERALLY SPONSORED RESEARCH OR DEVELOPMENT

The invention described herein was made with U.S. government ("Government") support under Contract No. W911NF-21-C-009, awarded by the U.S. Army. As a result, the Government has certain rights in this invention.

FIELD

The disclosure relates generally to devices, systems, and methods for cybersecurity, including, for instance, ransomware detection, protection, and mitigation. In particular, embodiments of the disclosure detect and block malicious actions in a computer system or computing device, preserve important data before malicious software can destroy it, and the computer system or computing device has no visible agent, process, and/or software for malicious software to detect.

BACKGROUND

By some estimates, the worldwide cybersecurity market was valued at $167 billion in 2020 and is expected to grow roughly 11% from 2021 to 2028. For instance, the U.S. Department of Defense cybersecurity budget was $6.7 billion in 2017, and is expected to almost triple to $18 billion by 2022. Cybersecurity spending in the oil and gas industries was expected to hit almost $2 billion by 2019.

Cybersecurity is also currently one of the highest-growth markets due to high-profile, large-scale attacks against leading companies, which need to protect their intellectual property. Moreover, cybersecurity is unique since almost all industries (e.g., healthcare, retail, entertainment, transportation, governments, militaries, etc.) require improved software and services, since existing products can be difficult to use and often do not protect against rapidly-evolving threats.

As a result, high demand for information security systems is expected to continue across a variety of industries and organizations, including, for instance, government agencies, military agencies, and private sector companies, due to enhanced threats from hackers, nation states, and criminals with increased access to automated tools and services.

Indeed, the number of stealthy, targeted, financially-motivated attacks is increasing. Many such attacks are aimed at exploiting vulnerabilities in endpoint devices. As a result, many companies and industries have an increasing awareness, and need, for a multi-layered seamless approach for ransomware protection. Signature-based antivirus and anti-spyware protection measures, which are traditionally provided by antivirus software, are not sufficient to deal with the current stream of constantly evolving cyberthreats.

Given the foregoing, there exists a significant need for devices, systems, and methods that can detect, mitigate, and protect against malicious actions, such as those executed by ransomware. In particular, there is a need for cybersecurity solutions that stealthily detect and block advanced ransomware strains, including those that are fileless, polymorphic, and employ state-of-the-art anti-analysis and anti-detection methods.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

Embodiments of the present disclosure are directed towards devices, systems, and methods for mitigating malicious actions and/or processes, such as, for instance, those executed by ransomware. Specifically disclosed herein are methods, devices, and/or systems that mitigate the threat of ransomware across a wide range of devices including, for example, servers, storage systems, computers, and portable storage devices. At least one embodiment stealthily detects malicious actions by interposing when a file is opened for writing, creating a temporary checkpoint, comparing existing data in the file to what will be written to determine if it will be destructive, and, if the behavior is destructive and/or malicious, preserving the file.

At least one embodiment of the disclosure can be placed and/or ported into a portable device or any peripheral (e.g., a universal serial bus (USB), external serial advanced technology attachment (eSATA), Thunderbolt, Institute of Electrical and Electronics Engineers (IEEE) 1394 (e.g., FireWire), Non-Volatile Memory Express (NVME), etc. device), thereby creating a ransomware mitigation solution that can be used to protect a variety of computing devices and storage devices.

In at least a further embodiment, the ransomware mitigation methods, devices, and/or systems described herein comprise artificial intelligence (AI) that is anthronoetic (i.e., that thinks at a human level and with a human style).

In at least one embodiment, the ransomware mitigation methods, devices, and/or systems have the following capabilities: (1) a behavioral analysis capability which is, e.g., the ability to detect and block malicious actions without the use of signatures; (2) a data analysis ability which is, e.g., the ability to further reduce false positives by inspecting data being manipulated; (3) a data recovery ability which, e.g., preserves important data prior to destruction, and outside the reach of malware; and (4) a stealth ability which, e.g., has no visible agent, process, software, or the like for ransomware to detect.

At least one embodiment of the disclosure does not require access to the Internet, and functions in isolated environments without Internet access. The aforementioned at least one embodiment may also be capable of detecting and blocking advanced ransomware strains, including, but not limited to, ones that are fileless, polymorphic, and/or employ state-of-the-art anti-analysis and/or anti-detection methods.

Embodiments of the present disclosure have the ability to protect computer devices and/or computer systems infected with some of the most destructive ransomware ever developed, including nation-state designed strains (e.g., Petya, Shamoon, WannaCry) and families such as Cerber, ZeroLocker, GandCrab, Jigsaw, and TeslaCrypt. Additionally, at least one embodiment was able to detect an obfuscated TeslaCrypt binary that has proven challenging for commercially-available, state-of-the-art cybersecurity software to recognize.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIGS. 4A-4B show various steps of a change detection algorithm (FIG. 4A), and the pseudocode of a non-limiting example of the change detection algorithm (FIG. 4B), according to at least one embodiment of the present disclosure.

FIGS. 8A-8B show the frame information structure (FIS) of an Identify command (FIG. 8A) and a Direct Memory Access (DMA) write command, according to at least one embodiment of the present disclosure.

DETAILED DESCRIPTION

Figure 1A:
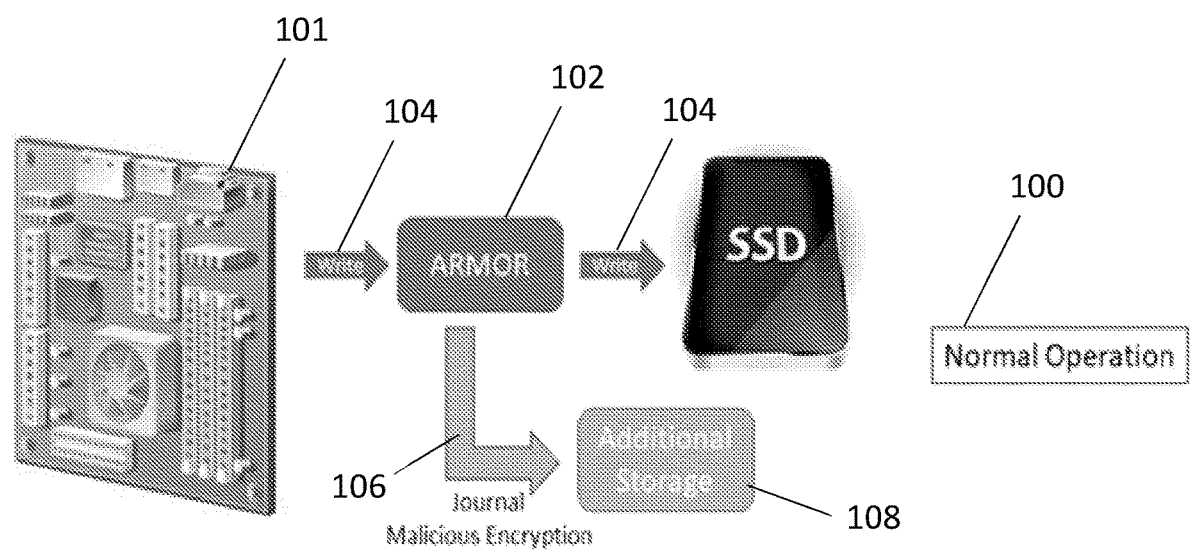
FIGS. 1A-1B show an Advanced Rapid Mitigation of Ransomware (ARMOR) system during normal operation (FIG. 1A) and file restoration operation (FIG. 1B), according to at least one embodiment of the disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective-C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users performing certain steps or carrying out certain actions with their client computing devices/platforms. In general, such users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g. a user may type out a response or input an action, or may choose from preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

Embodiments of the disclosure comprise methods, devices, and/or systems that mitigate the threat of ransomware across a wide range of devices including, for instance, computer servers, computer storage systems, cloud computing devices and/or servers, portable storage devices, and the like.

At least one embodiment comprises AI that is anthronoetic (i.e., that thinks at a human level and with a human style).

Further, at least one embodiment has the following capabilities: (1) a behavioral analysis capability which is, e.g., the ability to detect and block malicious actions without the use of signatures; (2) a data analysis ability which is, e.g., the ability to further reduce false positives by inspecting data being manipulated; (3) a data recovery ability which, e.g., preserves important data prior to destruction, and outside the reach of malware and (4) a stealth ability which, e.g., has no visible agent, process, software, or the like for ransomware to detect.

At least one embodiment of the present disclosure does not require access to the Internet and functions in isolated environments without Internet access. Ransomware mitigation embodiments disclosed herein may also be capable of detecting and blocking advanced ransomware strains, including, but not limited to, ones that are fileless, polymorphic, and/or employ state-of-the-art anti-analysis and/or anti-detection methods.

In at least one embodiment, the ransomware mitigation methods, devices, and/or systems employ advanced techniques to stealthily detect actions that may be attributable to malware, such as, for example, persistence, hiding, evasion, and process killing, thereby building a maliciousness score. Scoring may be cumulative based on specific detected actions, which are detailed further herein. When the score reaches a certain threshold, alerts, logging, and prevention can be launched. As a non-limiting example, a program or process that has a high maliciousness score causes the ransomware mitigation methods, devices, and/or systems described herein to perform further analysis of data change detection and manipulation via examination of data used in file reads and writes.

In at least one embodiment, an Advanced Rapid Mitigation of Ransomware (also referred to herein as "ARMOR") system is disclosed. ARMOR can be a drop-in replacement for solid state drives (SSD), thereby incorporating intelligent ransomware detection and mitigation algorithms into firmware to allow rapid recovery and restoration after an attack or infection. By placing ransomware detection into storage devices themselves, ARMOR creates an additional layer of defense that can quickly restore computers after infection, and that operates independently of the computer operating system. Accordingly, ARMOR can be resident inside, for instance, Serial Advanced Technology Attachment (SATA) controllers, universal serial bus (USB), flash firmware, or any other interface component. ARMOR further provides rapid recovery of data, unlike known anti-ransomware systems.

Figure 1B:
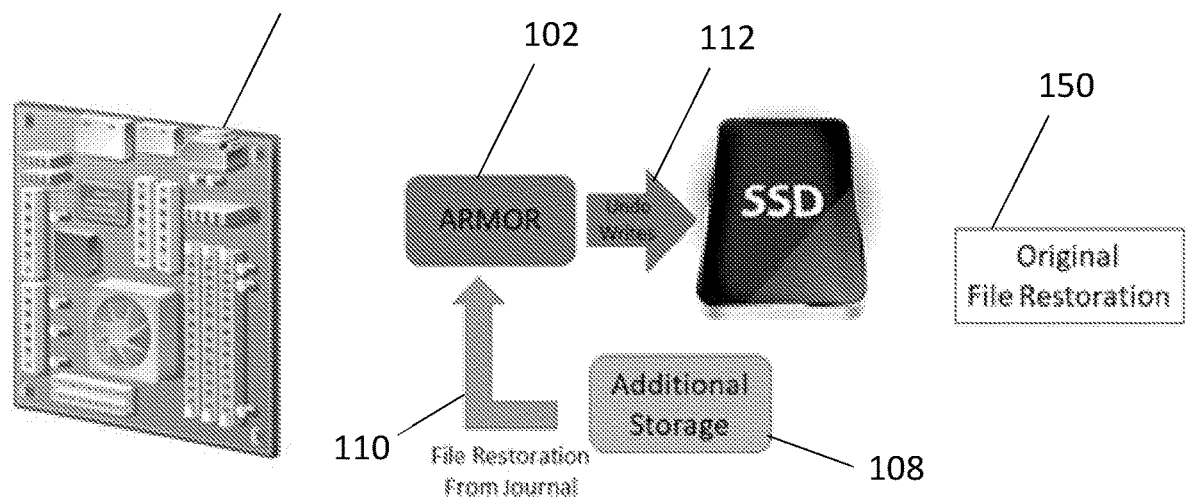

The functioning of at least one embodiment of ARMOR is shown in FIGS. 1A-1B. During normal operation 100, as shown in FIG. 1A, the ARMOR system 102 monitors writes 104 from computing device 101 and journals, at block 106, any malicious encryption that occurs. This journal resides on additional storage 108, which may be, for instance, a partition or portion of the drive itself, additional flash memory, and/or a memory card as part of a custom printed circuit board. During original file restoration 150, as shown in FIG. 1B, the ARMOR system 102 restores, at block 110, one or more original files from the additional storage 108. The ARMOR system 102 then undoes the malicious writes 112, replacing them with the one or more original files.

At least one embodiment of the disclosure supports a wide range of platforms (including, but not limited to, ARM, x86, etc.), computer operating systems (including, but not limited to, Windows, Linux, etc.), and computer hardware (including, but not limited to, hard drives, solid state disks, etc.). A skilled artisan will recognize that the ability to support hard drives is important since they are still sold in many entry level computers and account for more than 50% of data storage sold, as of 2019. Thus, embodiments of the present disclosure protect a wide range of computing devices (e.g., servers, desktops, laptops, etc.) as well as universal serial bus (USB), Thunderbolt, SCSI, etc. device firmware, thereby protecting a wide range of portable devices. As a non-limiting example, embodiments of the present disclosure can be placed into the firmware that controls the USB device or other storage media, resulting in a universal solution that can protect previous (e.g., hard disk drive (HDD), compact disc (CD), digital video disks or digital versatile disks (DVD), etc.), current (e.g., NAND memory devices, NOR flash memory devices, etc.), and next-generation (e.g., phase-change and/or memristor) data storage devices and/or technologies.

As will be known to a skilled artisan, computer code analysis generally requires an in-depth understanding of the operational principles of the central processing unit (CPU). The notions of both general purpose and specialized registers, the distinction between different methods of memory access, and instruction execution pipelining, all inform and support the analysis of ransomware and/or other potentially malicious software. The CPU elements required for such analysis start with memory addressing and control branching. Understanding registers and their purposes is also required since these provide detailed insight into the current execution state of the CPU.

After the CPU architecture, the next basic concept that is needed for program understanding is the so-called "opcode" or the instructions from a binary that is executed by the CPU. An assembly language instruction is composed of an opcode and a number of operands. The operands refer to data or memory locations which are sources or destinations for the operation indicated by the opcode. The x86 instruction set can refer to memory and register locations in a number of ways. These are referred to as "addressing modes," which include (1) register, (2) immediate, (3) direct, (4) offset, (5) indirect, and (6) base-index. The machine language encoding for different opcodes may contain variable numbers of bytes such that whether a memory byte is considered as part of one instruction or another depends on where one begins execution.

The x86 register layout can be composed of six segment registers, four general purpose index registers, and four general purpose registers. Each of the general-purpose registers have distinct uses for particular instructions, e.g., the accumulator (EAX) registers receive the result of an accumulator-based instruction, but they may be used for any purpose, except in those cases where a particular instruction makes use of them.

The four general-purpose registers are the accumulator (EAX), base (EBX), counter (ECX), and data (EDX). A skilled artisan will recognize that these names are remnants from earlier 8086 architectures and are largely customary, except in the case of the EAX and, to a more limited extent, the EDX, which are still used for accumulator computation results. The EBX was traditionally used to point to important memory locations for the active process, but is not associated with that purpose any longer. The ECX was used for indexes to optimize loop execution.

The four general-purpose index registers are the stack base (EBP), stack top (ESP), destination (EDI), and source (ESI). The EBP contains the memory address for the bottom of the stack for the current process. The ESP is a pointer to the current top of the stack, and is intimately tied to the successful execution of PUSH, POP, CALL, and RET instructions. The ESI and EDI are used by special purpose instructions for efficiently processing loop data in memory stored at the location indicated by ESI and the result of the computation placed in the location indicated by EDI.

The execution index pointer (EIP) is a read-only register which contains the memory location of the next memory location to execute. This makes it extremely dangerous to modify and is therefore why the EIP is read-only. Nevertheless, it is still extremely valuable for identifying the appropriate time to preempt code execution contained in locations which are questionable with respect to proper operation.

The memory for x86 architectures can be addressed in two ways: (1) real mode, and (2) protected mode. Real mode is the original memory addressing mode and utilizes specialized 16-bit segment registers to point to any memory in the 20-bit memory space. However, protected mode has largely supplanted real mode and uses the segment registers as indexes into a segment descriptor table. The descriptors are 32-bit addresses to which offsets are added. The final addresses may or may not refer to actual physical memory locations, depending on whether the memory is paged. The paged address obtained from the descriptor and the offset is then translated by the paging unit into a physical address.

The four original segment registers are the code (CS), data, (DS), stack (SS), and extra (ES) segment registers. These correspond in a literal way to the location of executable code, data memory, stack storage, and a user-definable memory location containing data that is often referenced. Various implementations, including, for example, the Intel 386 and later implementations, have two additional segment registers (FS and GS) that have no official designation, but are used for additional user memory structures.

Additionally, the structure and operating principles of a kernel and operating system must also be understood. This includes the organization and location of critical memory structures, process scheduling, system library information, kernel layout, and system calls (also referred to herein as "syscalls").

A skilled artisan will further recognize that the computer operating system (OS) is an important layer of software which masks the intricate complexity of the CPU from higher level programmers. The OS utilizes the structures and mechanisms provided by the CPU to handle the needs of modern multitasking and/or multi-user applications.

The most simplistic view of the OS designates two modes: (1) kernel, and (2) user. The user mode contains secured resources made available to most applications run by a user. The kernel mode is reserved for the OS and is primarily accessed by a special set of system calls which convey information between kernel and user space. This is necessary to ensure that information entering kernel mode is properly formatted and processed so as to cause no instability within the kernel itself.

The kernel is the core of the OS since it manages both the kernel mode and the user mode interface layer. The roles of the kernel fall into three main categories: (1) inter-process communication (IPC), (2) resource management, and (3) security. One of skill in the art will understand that these three functions are primary requirements for a functional modern OS.

A skilled artisan will further understand that the main resources for a computer and/or computing device are: (1) storage, (2) memory, and/or (3) CPU time. Memory is provided through a number of different mechanisms for various purposes. So-called "fast memory" is normally referred to as random-access memory (RAM) or cache, which is typically a volatile storage medium. So-called "slow memory" is typical for long-term storage and is non-volatile; such slow memory is what would normally be associated with a USB memory stick or hard drive.

Management of slow memory is typically done through drivers, which may treat the memory as a device (e.g., a USB memory stick) or as a file system (e.g., hard drive). Devices are typically incorporated into the same memory map used in paging for fast memory. Access to the memory provided is typically orders of magnitude slower than "true" fast memory, but these transactions are fewer in number and smaller in size than most fast memory transactions.

Filesystems are associated with very slow devices that are meant for long-term storage of information that may be copied into fast memory when needed. The filesystem defines various properties of the storage medium with respect to stability and security of the information. There are many different filesystems commonly available, but they are transparently handled by the OS kernel. Some filesystems that are unsupported by the OS can be incorporated by user space applications, which provide a more restricted level of access to the memory.

The organizational structure of the memory allocation is by processes. Different tasks are given individual process identifiers (PID). Each PID is given its own virtual memory space, which is mapped on to physical memory by the paging system and is allocated CPU time by the kernel scheduler. The process memory space includes, for instance, code and data. The code is executed whenever CPU time is allocated by the process scheduler.

One of skill in the art will recognize that processes often need to communicate with each other to achieve their purpose. This communication must be managed by the kernel so that physical memory is not unintentionally modified by different processes concurrently, and, when modification is desired, that it happens according to a protocol that will prevent errors. Non-limiting examples of these errors include race conditions, and deadlock (or, alternatively, livelock, which is a more dynamic form of deadlock).

A non-limiting example of a kernel is the NT kernel, which is used by all modern, Windows-based OS's from Windows XP to Windows 10. The kernel is a 32-bit/64-bit hybrid kernel, which is different from a monolithic kernel in which all kernel functions operate in kernel mode with a thin interface layer for user mode access. A reason for this difference is because some less critical functions of the NT kernel operate as user mode applications or services themselves.

One of skill in the art will generally recognize the various malicious actions that a program and/or piece of software can take, which include, for example, evasion, disruption, modification, destruction, and stealing. Non-limiting examples of malware classes, suspicious behaviors, and methods to identify each behavior are shown in, e.g., Grégio, André Ricardo Abed, et al., "Toward a Taxonomy of Malware Behaviors," *The Computer Journal* 58.10 (2015): 2758-2777.

Malicious actions, including the aforementioned ones mentioned, are only possible through the use of system calls, as identified in Table 1 below. Each action, taken individually (and out of context), is benign. However, when these actions are taken together in a specific order, they indicate actions that are typical of malware and ransomware. Accordingly, at least one embodiment of the disclosure can determine whether the actions are potentially indicative of malware and/or ransomware, as described in further detail below herein.

TABLE 1

System calls, their descriptions, and the category for actions important for understanding a program's behavior.

| Function Description | Syscall | Category |
| --- | --- | --- |
| Screen Capture | NtGdiBitBlt | Display |
| Screen Capture | NtGdiStretchBlt | Display |
| Send Message to Port | NtAlpcSendWaitReceivePort | Network |
| Read File | NtReadFile | File System |
| Create File | NtCreateFile | File System |
| Write File | NtWriteFile | File System |
| Delete File | NtDeleteFile | File System |
| Enumerate Key | NtEnumerateKey | Registry |
| Delete Key | NtDeleteKey | Registry |
| Create Key | NtCreateKey | Registry |
| Set Value for Key | NtSetValueKey | Registry |
| Delete Value for Key | NtDeleteValueKey | Registry |
| Open a Key | NtOpenKey | Registry |
| Create Process | NtCreateUserProcess | Processes |
| Kill Process | NtTerminateProcess | Processes |
| Create Mutex | NtCreateMutant | Mutexes |
| Open Mutex | NtOpenMutant | Mutexes |

TABLE 1-continued

System calls, their descriptions, and the category for actions important for understanding a program's behavior.

| Function Description | Syscall | Category |
| --- | --- | --- |
| Release Mutex | NtReleaseMutant | Mutexes |
| Generate Input Event from Software | NtUserSendInput | Keyboard |
| Get Key Asynchronously | NtUserGetAsyncKeyState | Keyboard |
| Get Key Synchronously | NtUserGetKeyState | Keyboard |
| Translate Keyboard Key Message | NtUserTranslateMessage | Keyboard |

Thus, at least one embodiment comprises a highly effective end-to-end technology solution that mitigates the threat of ransomware across a wide range of devices including, for instance, servers, storage systems, computers, and portable storage devices. The ransomware mitigation methods, devices, and/or systems disclosed herein employ advanced techniques to stealthily detect malicious actions and results in the creation of a checkpoint. To accomplish this, the ransomware mitigation methods, devices, and/or systems interpose when a file is opened for writing and create a temporary checkpoint, compare the existing data in the file to what will be written to determine if it is destructive, and, if the behavior is malicious, preserve the checkpoint.

Ransomware File Access Patterns

For malware detection and identification, important system calls that can be used to determine malicious actions are monitored and their context is established using a labeled, annotated control flow graph in order to understand the intent of a process or program. For ransomware detection and mitigation, the system calls that affect and manipulate files and the hard drive must be closely monitored. In particular, file access patterns can be used to enhance and verify the maliciousness score of a program or process, in addition to other hostile actions (e.g., killing processes, writing to the registry, network communications, etc.).

Figure 2:
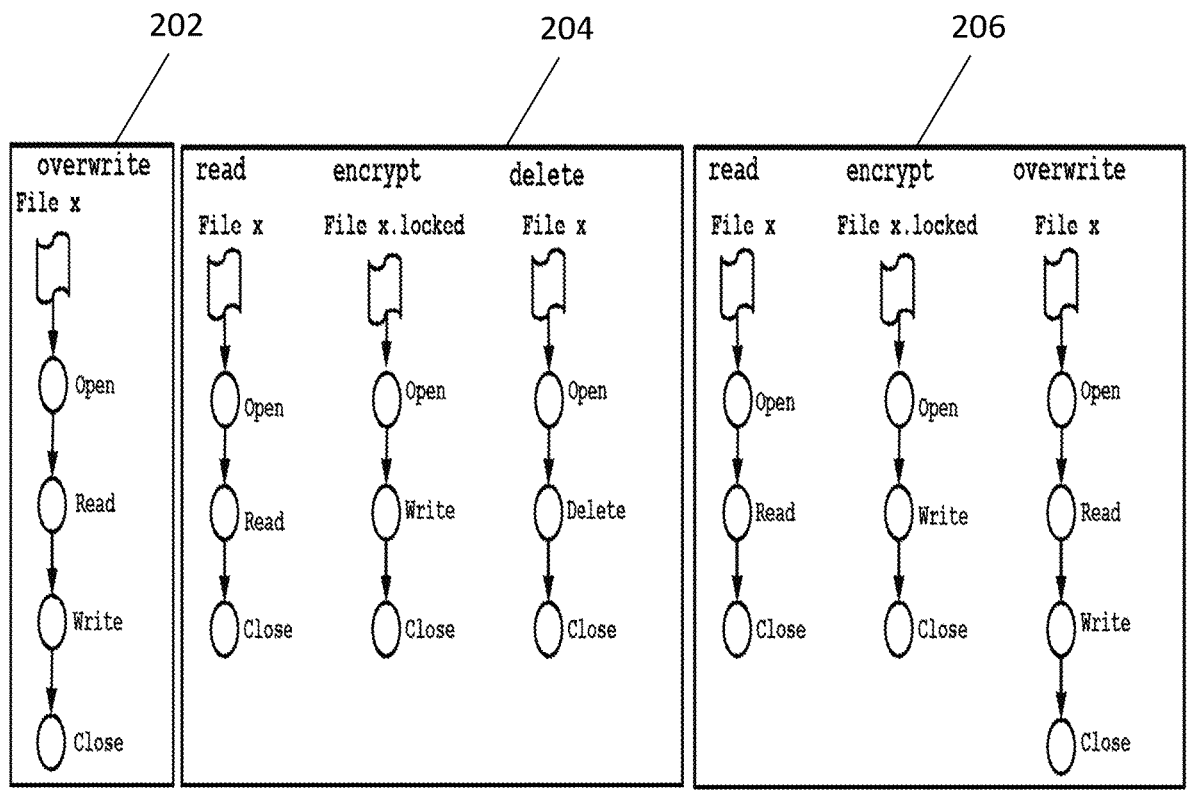
FIG. 2 shows file access patterns for a range of ransomware families, according to at least one embodiment of the disclosure.

The file access patterns for a wide range of ransomware families is shown in FIG. 2, which is taken from Kharaz, Amin, et al., "{UNVEIL}: A Large-Scale, Automated Approach to Detecting Ransomware," 25th {USENIX} Security Symposium ({USENIX} Security 16), 2016. Specifically, a file access pattern 202 is shown in which the target files are simply overwritten, as in, e.g., the GandCrab and Cryptowall variants. A file access pattern 204 is also shown in which the target files are read, encrypted, and then deleted, as in, e.g., WannaCry variants. Finally, a file access pattern 206 is shown in which the target files are read, encrypted, and then overwritten, as in, e.g., the CryptVault families.

Overwriting a file signature is a promising indicator for data destruction caused by ransomware. While some files, such as ASCII text files, do not use file signatures, most other file types do. Thus, when overwriting the beginning of a file, embodiments of the disclosure (e.g., one or more embodiments of ARMOR 102) can check to see if the write buffer contains a file signature that matches the file extension. At least one embodiment uses a file signature corpus from garykessler.net, entitled "GCK's File Signatures Table," dated Jun. 1, 2021. If the system call overwrites the file signature with data that does not match the file extension, then the write can be flagged as suspicious.

One of skill in the art will recognize that a signature behavior of ransomware is its encryption of the victim's data. Ransomware must read the original data, write encrypted data, and remove the original data to complete this transformation. However, only detecting calls to encryption libraries and file access patterns is insufficient to detect ransomware, since many variants implement their own versions of encryption algorithms. Thus, a method is required to recognize encryption apart from library calls and system calls.

Recognizing Encryption

The recognition of encryption is essential since such encryption is used to hold data hostage. Thus, it is vital to see when unencrypted data is maliciously encrypted. Several algorithms were studied to determine how well they could detect encryption. Tests were performed by first selecting a wide range of common file types that are typically targeted by ransomware, including documents (*.txt, *.xml, *.pdf, *.doc, *.docx, *.ppt, *.pptx), photos (*.jpg, *.png), and music (*.mp3). Then, each file was encrypted using algorithms typically used by ransomware including aes-256, blowfish, chacha, and rc4. The original unencrypted files were also compressed using bz2, 7zip, gzip, and xz, since the entropy (e.g., the estimate of how much information each bit carries) of compressed files and encrypted files are similar. The unencrypted files, encrypted files, and compressed files were then fed into several algorithms including entropy, serial correlation, and chi-squared. Other statistical tests (e.g., one or more of the tests within the National Institute of Standards and Technology (NIST) Statistical Test Suite) may also be used. As will be described in further detail below, entropy calculations could not distinguish between encryption and compression, while at least the serial correlation technique easily detected the encryption of data.

Serial Correlation

Figure 3:
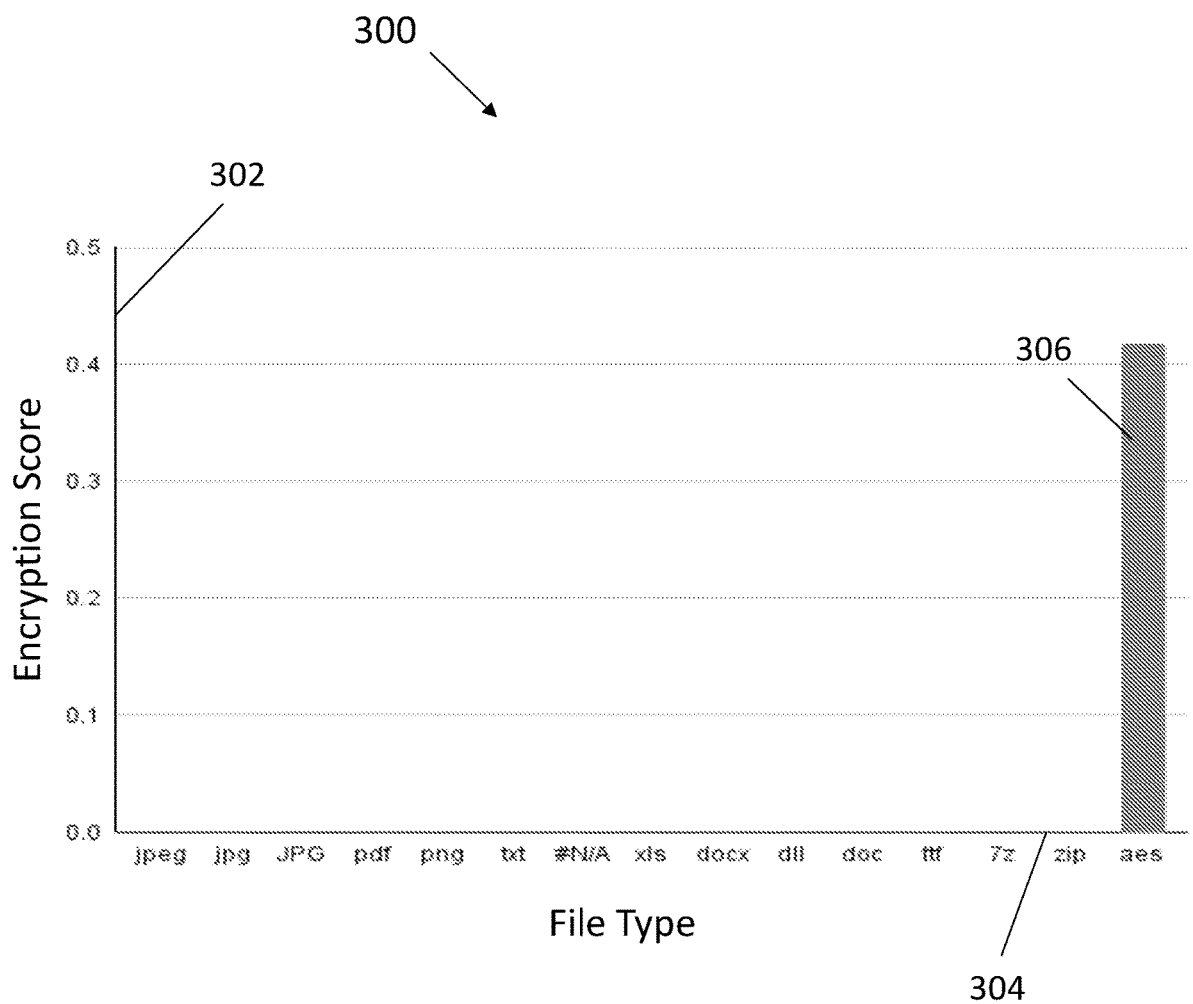
FIG. 3 is a graph showing encryption scores, as determined using serial correlation, for a variety of file types, according to at least one embodiment of the present disclosure.

Serial correlation is used in statistics to describe the relationship between observations of the same variable over specific periods. If a variable's serial correlation is measured as zero, there is no correlation, and each of the observations is independent of one another. Conversely, if a variable's serial correlation skews towards one, the observations are serially correlated, and future observations are affected by past values. Essentially, a variable that is serially correlated has a pattern and is not random. Using a classifier to calculate an encryption score resulted in 100% of the encrypted files being detected, as shown in FIG. 3.

Specifically, the figure is a graph 300 that shows an encryption score 302, as determined using a serial correlation technique, for various file types 304. As can be seen, the technique correctly identified all of the encrypted files 306.

Change Detection

Another technique for identifying the malicious encryption of files is to detect file changes. For instance, prior to a ransomware attack, the entropy values of files written over time would be generated randomly, but consistently. That is, a skilled artisan would expect that disk writes with similar entropies occur at roughly equal probabilities independent of time. For example, a disk write with a logged entropy value of 0.2 has an equal probability of occurring at time t=5,000 as it has of occurring at time t=10,000. However, once a ransomware attack occurs, these probabilities will likely change. A disk write with a low entropy value of 0.2 becomes much less likely to occur after a ransomware attack than before. By contrast, a disk write with high entropy values is affected inversely.

In at least one embodiment of the disclosure, a change detection algorithm looks at two "windows" in a data stream, comprising, for instance, m1 and m2 entries, respectively. The first window corresponds to the start of the data stream, while the second window is a sliding window that slides along the data stream. As this second window slides, a test statistic d is used to quantify how close the distribution of samples is. If the test statistic is above a certain value alpha (a), determined through a process described below herein, a change is reported to have occurred. The algorithm is then reset to consider this point the start of the stream.

Figure 4A:
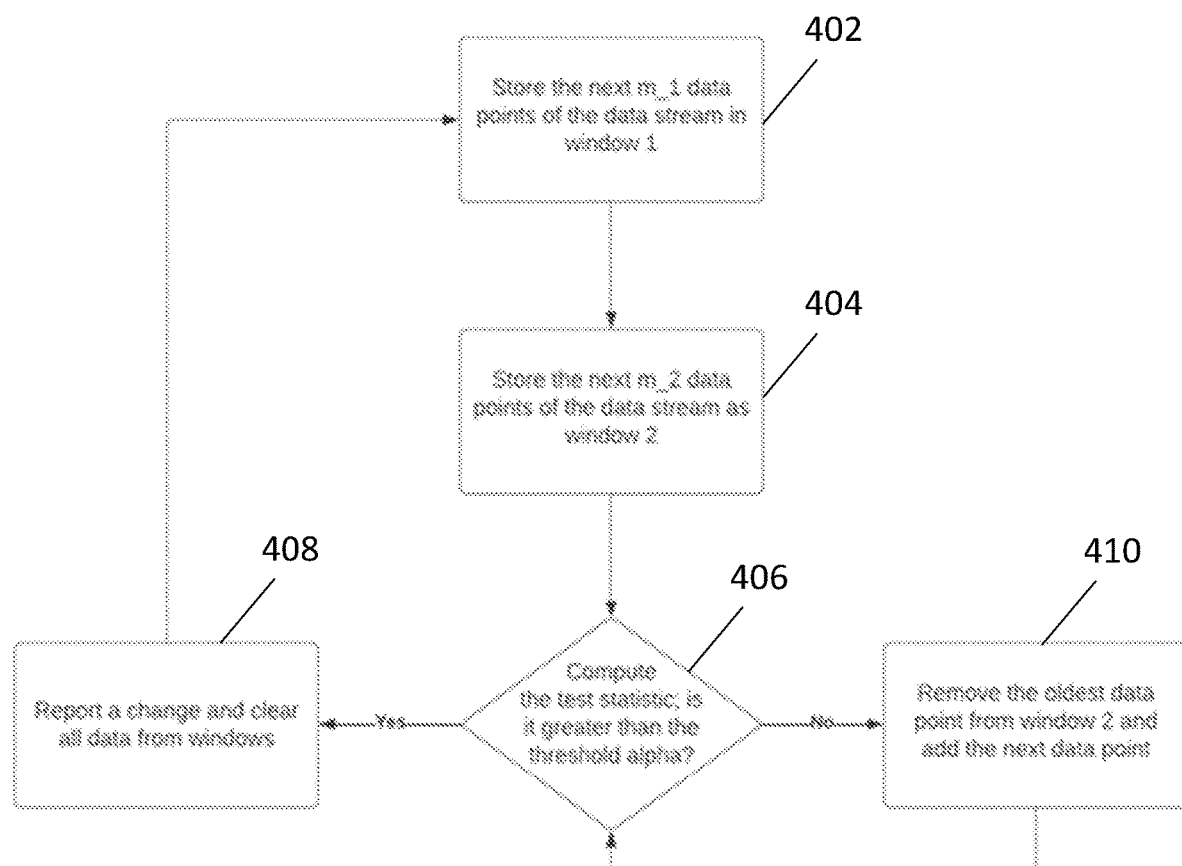

FIG. 4A is a flow diagram displaying various steps of the aforementioned change detection algorithm. First, at block 402, the algorithm stores the next m1 data points of the data stream in the first window (that is, window 1). The algorithm, at block 404, also stores the next m2 data points of the data stream in the second window (that is, window 2). At block 406, the algorithm computes the test statistic d and determines whether this statistic is greater than the α value. If the statistic is greater than the α value, the algorithm, at block 408, reports a change and clears all data from the first and the second windows, to consider this change point the start of the stream. If the statistic d is not greater than the α value, the algorithm, at block 410, removes the oldest data point from the second window and adds the next data point. The algorithm the returns to block 406 to recompute the statistic d.

FIG. 4B shows the pseudocode of a non-limiting example of a change detection algorithm 450, specifically the FIND_CHANGE detection algorithm taken from D. Kifer et al., "Detecting Change in Data Streams," Proceedings of the Thirtieth International Conference on Very Large Data Bases, Vol. 30, Toronto, Canada: VLDB Endowment, pp. 180-191 (2004) (isbn: 0120884690). See also Kharaz, Amin, et al., "{UNVEIL}: A Large-Scale, Automated Approach to Detecting Ransomware," 25th {USENIX} Security Symposium ({USENIX} Security 16), 2016. This algorithm is also shown below:

TABLE 1

Pseudocode for a FIND.CHANGE algorithm.
Algorithm 1 FIND.CHANGE

```
for i ∈{1, ... , k} do
    c₀ ← 0
    Window₁,ᵢ ← first m₁,ᵢ points from time c₀
    Window₂,ᵢ ← first m₂,ᵢ points from in stream
end for
while not at end of stream do
    for i ∈{1, ... , k} do
        Slide Window₂,ᵢ by 1 point
        if d(Window₁,ᵢ, Window₂,ᵢ) ≥ αᵢ then
            c₀ ← current time
            Report change at time c₀
            Clear all windows and go to step 1
        end if
    end for
end while
```

In at least one embodiment, multiples of the first and second window pairs are used to increase robustness of the change detection algorithm. It should be appreciated that a window pair with a small m1 and m2 is more sensitive to short-lived, large changes, while a window pair with a larger m1 and m2 is more sensitive to long-lived, small changes. Since both types of changes are of interest and may occur in a ransomware attack, the change detection algorithm is able to detect both. In order to fully implement this algorithm, suitable functions and test statistics d are to be defined, and a method of determining α can be determined. In at least one embodiment, the test statistics d can be calculated as described below herein.

Although the total variation test is less suitable for change detection purposes since it may be overly sensitive to extremely slight changes in the underlying distribution, this test may be modified. Thus, in at least one embodiment, a Φ test can be defined as follows: the first window has values $X_1$ and the second window has values $X_2$. For each segment A of real numbers (e.g., a set of the form $\{x|x<a\}$ for a fixed real number a), the following are determined: the fraction of values in $X_1$ which fall in A, and the fraction of values in $X_2$ which fall in A. The former is denoted by $S_1(A)$ and the latter is denoted by $S_2(A)$. The aforementioned are combined in the following formula:

$$\frac{|S_1(A) - S_2(A)|}{\sqrt{\min\left\{\frac{S_1(A) + S_2(A)}{2}, \left(1 - \frac{S_1(A) + S_2(A)}{2}\right)\right\}}}$$

In at least one embodiment, the maximum such value over all segments A is found (e.g., all segments A of real numbers in the range of 0.35 to 0.45), which then results in the Φ value over segments at this point in the change detection algorithm. The Φ value over intervals is defined similarly, but using all intervals rather than all segments. Further, a Ξ test may be defined similarly, but by replacing the minimum in the denominator with multiplication. The numerator is identical to how the base total variation test is defined, though the number of sets A which are considered by the test can be reduced by only considering segments. These denominator factors result in increasing the sensitivity of the Φ and Ξ tests to changes, as well as improving their ability to determine the α value.

Implementing one or more of the Φ and Ξ tests against a data stream can be accomplished through a data structure referred to herein as a "KS-Structure," which stores a sorted list of values either in window $X_1$ or $X_2$. By also storing the value $-1/m_1$ or $-1/m_2$ as appropriate, the values of $S_1(A)$ and $S_2(A)$ required to compute Φ or Ξ can be computed with minimal branching by simply adding these associated values, slightly improving speed. At least one embodiment of the disclosure stores this sorted list in the form of a balanced binary tree or similar structure (e.g., the C++ std::multiset). Accordingly, this structure can be maintained as the window slides in $O(\log(m_1+m_2))$ time.

Determining Alpha (α)

Generally, given (1) streams of data of length n generated by the same probability distribution, and (2) the maximum value which the function d returns when the change detection algorithm is applied with a fixed test statistic to this stream, then the probability that this maximum value is greater than α is independent of the distribution used to generate the samples. In at least one embodiment, α is obtained by generating a large number of these length n streams, taking the maximum value as above, and then taking the 1−p percentile of these maximum values. By generating a in this way, at least one embodiment of the change detection algorithm, when applied to any data stream generated by the same probability distribution, will only report a false positive with probability p.

Figure 5:
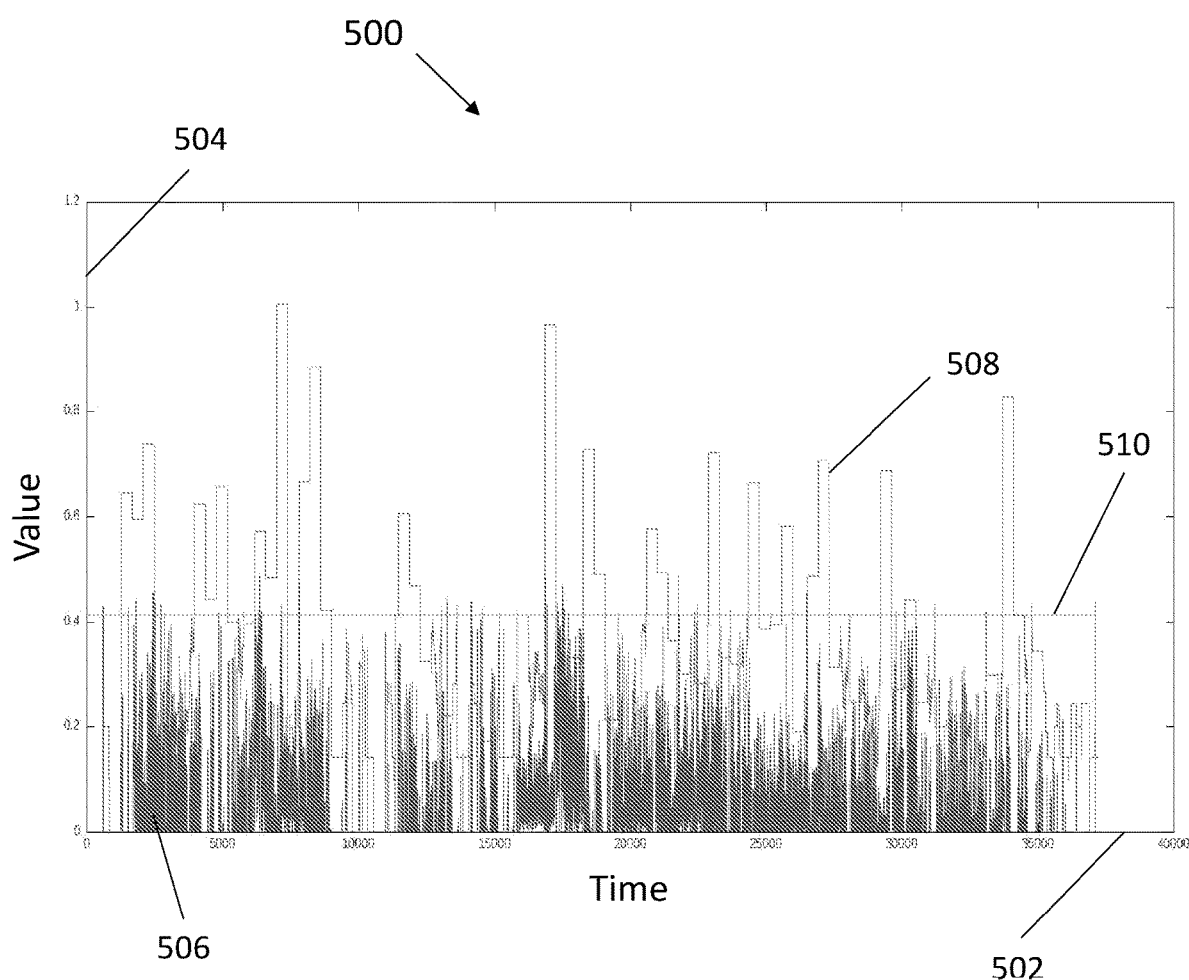
FIG. 5 is a graph showing a sample result from applying a change detection algorithm on typical user activities, according to at least one embodiment of the present disclosure.

Turning now to FIG. 5, a graph 500 is shown displaying a sample result from the application of a change detection algorithm on typical user activities, such as the installation of programs and the editing of text files. The x-axis 502 represents time, while the y-axis 504 represents numerical values. Trace 506 corresponds to the serial correlation entropy values, while trace 508 represents the value of the test statistic d. The threshold a value is shown as trace 510. The data shown on graph 500 is recorded from a session of installing packages on a Linux system, followed by work on implementing the algorithms and surrounding program to run these tests. Installing packages included a compressed download of the required files leading to the general high entropy values recorded. As can be seen, later points in time mostly contained writes with recorded entropy 0. When trace 508 (the value of the test statistic d) crosses trace 510 (the threshold a value), a change detection has occurred.

Ransomware Detection and Mitigation in SATA Controllers

Serial Advanced Technology Attachment (SATA) is a computer communications bus that sits between a host computer and storage devices such as, for instance, hard disk drives (HDD) and solid state drives (SSD). At least one embodiment of the disclosure adds ransomware detection and mitigation capabilities into SATA controllers, thereby adding a layer of defense below the operating system, yet above lower-level devices that control, e.g., the actual flash memory as part of the Flash Translation Layer (FTL). In at least one embodiment, ARMOR is integrated as part of a custom SATA controller to perform at least the following functions: (1) monitoring and journaling all file operations, and (2) providing the ability to restore files to their original condition via, e.g., selecting a button displayed on a graphical user interface (GUI), secure SATA commands, and the like. The implementation of a custom SATA controller can be done using a Field Programmable Gate Array (FPGA), which can perform journaling, restoration, serial correlation, and malicious file I/O access pattern recognition with low latency.

Figure 6:
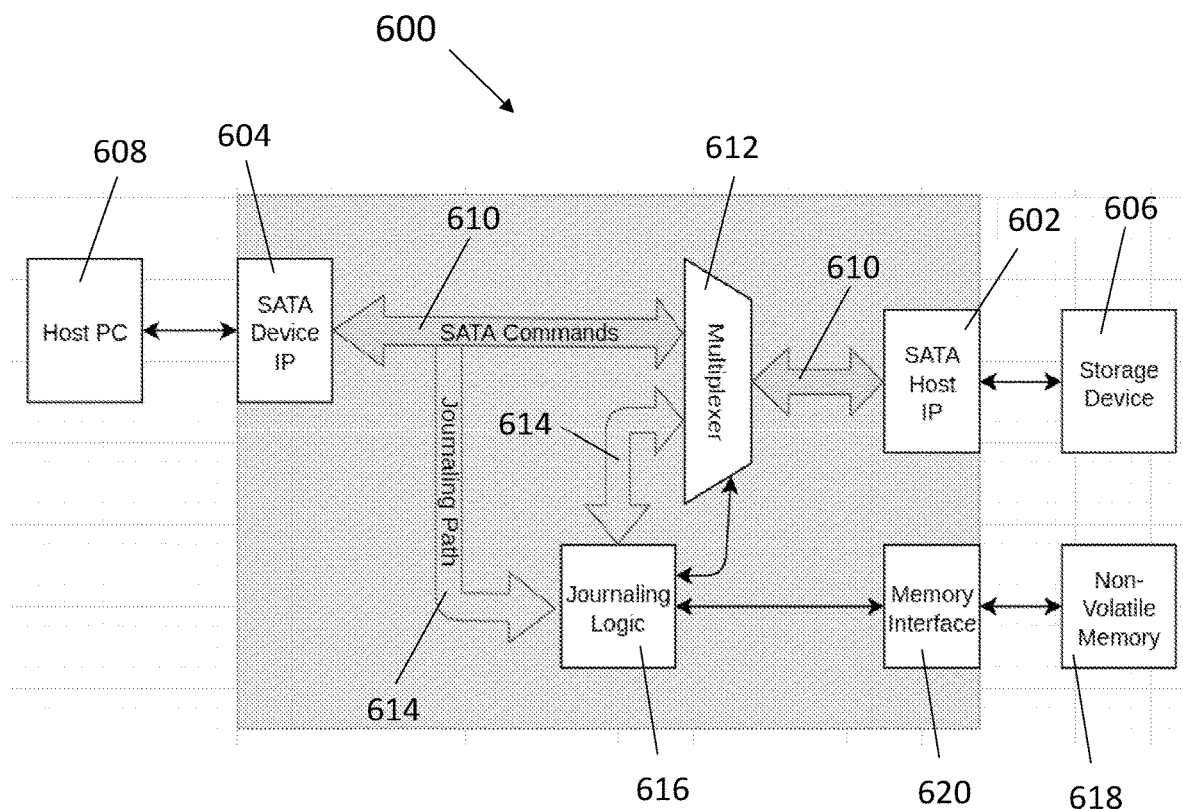
FIG. 6 is a block diagram that displays the design and data flow of a Field Programmable Gate Array (FPGA), according to at least one embodiment of the present disclosure.

FIG. 6 is a block diagram that displays the design and data flow of a FPGA 600, according to at least one embodiment of the disclosure. Generally, the FPGA 600 converts the serialized SATA packet into comprehensible data that the FPGA logic can use. The FPGA 600 comprises a host IP 602 and a device IP 604. The host IP 602 is a controller that is configured to read and write from a storage device 606. The device IP 604 interfaces with the host PC 608, receiving commands from the host PC and responding to these commands. Accordingly, FPGA 600 utilizes a bridge design that allows the device IP 604 to receive and decode commands coming from the host PC 608, and then sending that information, at block 610, to the host IP 602. Such sending of information may proceed via, for instance, multiplexer 612. Once the host IP 602 receives the information, the host IP can then execute the information on the storage device 606.

To allow for low latency during normal operations, the path between the host PC 608 and the storage device 606 can remain as minimal as possible. Block 610 shows the normal operating path for any standard storage device. As the SATA traffic and/or information is received by the device IP 604 from the host PC 608, the traffic and/or information will be forwarded to the host IP 602 to go into the storage device 606. The multiplexer 612 will default to the normal path until, and unless, it receives a command for a rollback and/or restoration.

Additionally, there is a journaling path at block 614 that stems (1) from the main information path 610 to journaling logic 616, and (2) from the journaling logic 616 to multiplexer 612. This journaling path forwards any traffic that is received on the main information path over to journaling logic 616. The journaling path permits interference-free access to SATA traffic and/or information traveling between the host IP 602 and the device IP 604. The journaling logic 616 records write location and write contents so that changes can be undone if needed. Journaling logic 616 may further detect and journal only malicious encryption actions, thereby minimizing the amount of storage space required. The journal may be saved in, for instance, non-volatile memory 618 via a memory interface 620, since the information must persist even after the computer system has been shut down. Thus, the non-volatile memory 618 can act as a ring buffer which will fill up with the journal information (e.g., write location and write contents) as the computer system is running. When the storage has filled up, oldest entries may be overwritten.

When a user-initiated rollback occurs (e.g., via a secure, custom SATA command or the push of a button on, for instance a GUI display), the journaling logic 616 will take over the main traffic path 610 and begin initiating a sequence of SATA commands to the host IP 602 for rollback. The journaling logic 616 can control the multiplexer 612 to switch between receiving commands from the host PC 608 or from the journaling logic itself. Several journaling options may be used, including, for instance, the recording and saving of all write commands and data within the SATA traffic and/or information flow (e.g., main traffic path 610) into the non-volatile memory storage 618. Alternately, journaling write commands and data pertaining only to encrypted write operations recognized via serial correlation or change detection is possible. Finally, the journaling of malicious encryption commands detected by the file I/O access patterns described above herein can further reduce the amount of data saved. It should be appreciated that the addition of these features will not substantively increase latency during normal operations since the journaling path 614 is isolated from the main information path 610.

Custom FPGA Design

Figure 7:
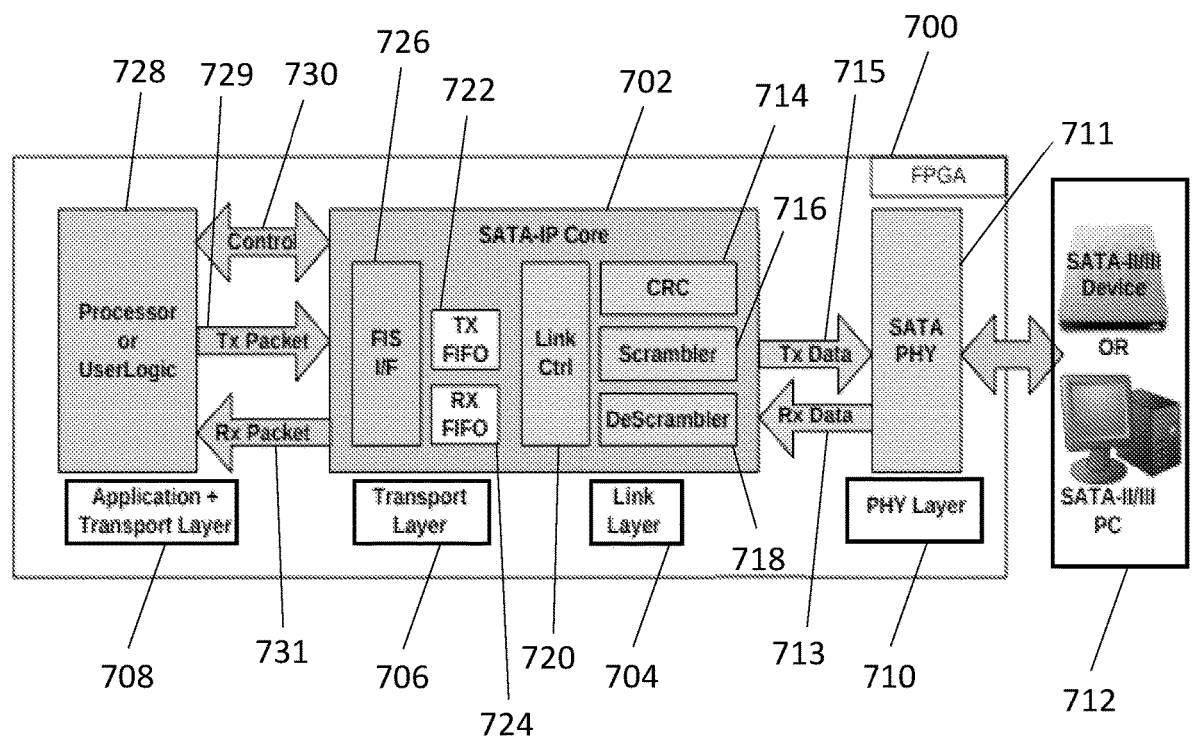
FIG. 7 shows the structure of a FPGA, according to at least one embodiment of the present disclosure.

Turning now to FIG. 7, an embodiment of an FPGA 700 is shown that comprises a SATA IP core 702. The purpose of the core 702 is to handle the SATA communication stack by converting information from the serial data stream into commands that the FPGA logic can interpret. The IP core 702 can implement a link layer 704 and a part of a transport layer 706 for communication between an application layer 708 and a physical layer (PHY) 710. The SATA device and/or SATA PC 712 may comprise computer chips that can handle data rates of up to, for instance, 12.5 gigabits per second, or more than double the rates for SATA 3.

The link layer 704 can transmit SATA primitives based on the control signals from the transport layer 706. Conversely, the link layer 704 can convert SATA primitives received from the PHY 710 into control signals for the transport layer 706. The link layer 704 also handles a cyclic redundancy check (CRC) 714, and further comprises a scrambler 716 and a descrambler 718 for the scrambling/descrambling of the outgoing/incoming frames so that they are sent to their necessary destination layers.

The core 702 also includes link control 720, TX FIFO 722, RX FIFO 724, and frame information structure (FIS) I/F 726. In operation, the SATA PHY 711 sends RX data 713 to the core 702, while receiving TX data 715 from the core. Additionally, the Processor/UserLogic 728 sends TX packet 729 to the core 702, while receiving RX packet 731 from the core. Finally, data flow control 730 passes between the Processor/UserLogic 728 and the core 702.

Interactions with the control signals of the IP core (e.g., core 702) may be done using a memory map interface. Known interfaces include, for instance, the Advance eXtensible Interface (AXI) 4 Lite or the Local Memory Bus (LMB) protocol. A skilled artisan will appreciate that control signals only instruct what the IP core should do with the SATA packet and does not directly interface with the storage device itself. The commands that tells the storage device what to do is within the packet. This means that if the FPGA (e.g., FPGA 600, 700) wants to perform any type of action to a storage device (e.g., storage device 606) independent from the PC, it needs to construct the proper SATA packets first in memory, and then use the memory-mapped interface to instruct the IP core to send the packet out to the device.

The frame information structure (FIS) of a SATA packet may include, for instance, a group of double words (e.g., 32-bits) that hold the command, type, sector location, and data. Depending on what commands and packet type is sent, the latter parts of the packet field will change accordingly. For example, FIG. 8A shows the FIS structure 800 for an Identify command, which is also shown below.

TABLE 2

FIS structure for an Identify command.

| | | | | | | | | |
|---|---|---|---|---|---|---|---|---|
| 0 | Features 00h | command ECh | C 1 | R 0 | R 0 | R 0 | PM Port 0h | FIS Type (27h) |
| 1 | Device A0h | LBA High 00h | | LBA Mid 00h | | | | LBA Low 00h |
| 2 | Features (exp) 00h | LBA High (exp) 00h | | LBA Mid(exp) 00h | | | | LBA Low(exp) 00h |
| 3 | Control 00h | Reserved(0) | | sector Count(exp) 00h | | | | Sector Count 00h |
| 4 | Reserved (0) | Reserved (0) | | Reserved (0) | | | | Reserved (0) |

Figure 8B:

FIG. 8B shows the FIS structure 850 for a Direct Memory Access (DMA) write command, which is also shown below.

TABLE 3

FIS structure for a DMA write command.

| | | | | | | | | |
|---|---|---|---|---|---|---|---|---|
| 0 | Features 00h | command 35h | C 1 | R 0 | R 0 | R 0 | PM Port 0h | FIS Type (27h) |
| 1 | Device E0h | LBA High LBA[23:16] | | LBA Mid LBA[15:8] | | | | LBA Low LBA[7:0] |
| 2 | Features (exp) 00h | LBA High(exp) LBA[47:40] | | LBA Mid(exp) LBA[39:32] | | | | LBA Low(exp) LBA[31:24] |
| 3 | Control 00h | Reserved (0) | | sector Count(exp) sector_count[15:8] | | | | Sector Count sector_count[7:0] |
| 4 | Reserved (0) | Reserved (0) | | Reserved (0) | | | | Reserved (0) |

Although these are the same length and type, the contents within each of the fields are different from each other. Using this information, the journaling logic (e.g., journaling logic 616) can analyze the command field and then act accordingly while conforming to the packet structure. With this information, the FPGA, in at least one embodiment, is configured to construct its own SATA packets in order to perform independent operations without the need of a host PC.

It should be appreciated that various known boards can be used, including, for instance, boards that have features common to embedded processing systems, such as Double Data Rate 3 (DDR3) random access memory (RAM), an 8-lane Peripheral Component Interconnect (PCI) Express, tri-mode ethernet PHY, general purpose I/O (GPIO), and a Universal Asynchronous Receiver-Transmitter (UART) interface. It should further be appreciated that the board may also comprise FPGA Mezzanine Cards (FMC) connectors, thereby allowing for expansion cards that contain gigabit transceiver features not natively available on the evaluation board itself. Peripherals that may be used include, for instance, flash memory (e.g., 128 megabyte (MB) flash memory) to store the journal, and one or more FMC expansion slots to connect a daughter card with one or more SATA lines.

In at least one embodiment, additional modules may be used to allow the board to have SATA interfacing capabilities of up to, e.g., 4 SATA devices. One of the SATA ports may be used to connect directly to the host PC. A second such port may be used to connect to the SSD.

In at least a further embodiment, a custom printed circuit board comprises the FPGA (e.g., FPGA 600, 700), flash memory (e.g., for the journal), and one or more SATA interface components as described above herein. The custom printed circuit board may house all components included in, e.g., a standard 2.5" SSD into an enclosure with the dimensions of a standard 3.5" hard disk drive (e.g., 3.75" length, 5.78" width, and 1.02" height). The FPGA may also be ported to an Application Specific Integrated Circuit (ASIC) for lower cost, size, and/or complexity.

Software Interface

Figure 9:
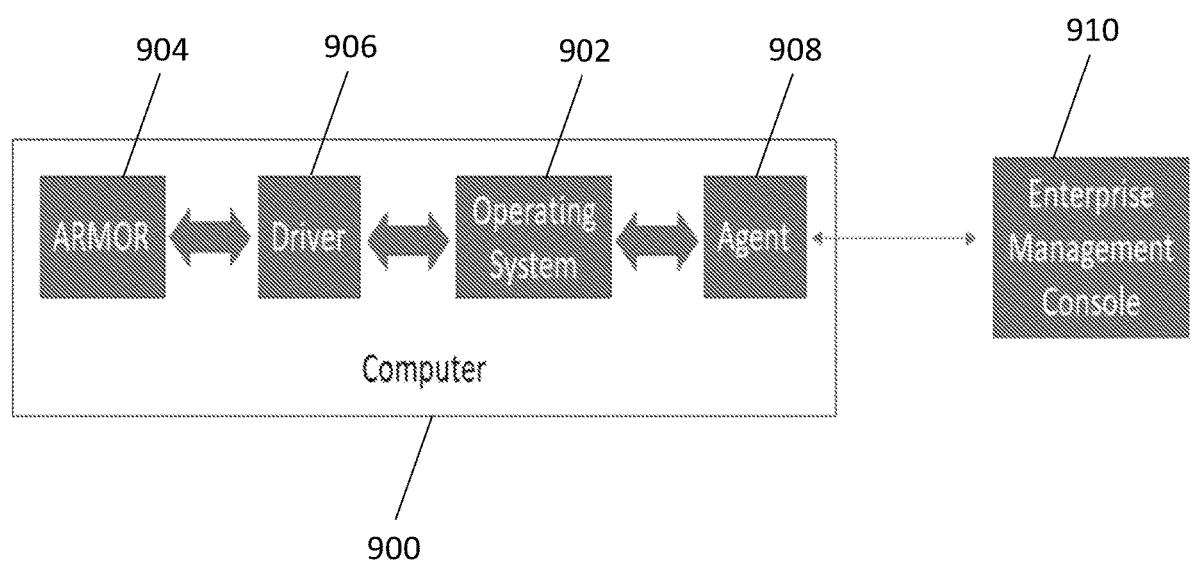
FIG. 9 is a diagram of the software interface for controlling ARMOR, according to at least one embodiment of the present disclosure.

While hardware aspects of embodiments of ARMOR have been described above herein, FIG. 9 shows a software interface for controlling ARMOR. Computer 900 comprises an operating system 902, ARMOR 904, a driver 906, and an agent 908. In at least one embodiment, the driver 906 and the agent 908 can securely control ARMOR 904. One or more users (e.g., enterprise administrators using an enterprise management console 910) may use the driver and the agent to securely control ARMOR even in the presence of malicious programs, assuming that certain portions of the operating system 902 (e.g., the networking subsystem) are still operational. Otherwise, the user can restore the SSD to the last checkpoint (e.g., a snapshot of the SSD state) by using one or more buttons on the custom SSD.

In at least one embodiment, all communications between the enterprise management console 910 and the agent 908 is secured using digital signatures (e.g., transport layer security (TLS)). The TLS protocol provides, via certificates, cryptography (e.g., privacy, confidentiality, integrity, and authenticity) between two or more communicating computer applications. This prevents malware or unauthorized users from taking control of ARMOR 904 and performing unwanted operations. The agent 908 may further have an application programming interface (API) that allows for other tools (e.g., endpoint security applications such as Crowdstrike's application) to control it. This results in flexibility for a host of other applications and/or uses. Non-limiting examples of commands that can be controlled include, for instance, (1) taking a checkpoint, (2) restoring to a given checkpoint, (3) listing checkpoints, (4) controlling the journaling operation, (5) controlling encryption detection and/or malicious encryption detection, (6) showing which data will be lost when restoring to a given checkpoint, (7) retrieving a checkpoint over the network, and (8) restoring a checkpoint from a first computer to a second computer.

In at least an additional embodiment, the driver 906 and the agent 908 are configured to permit the use of standard enterprise group policies (e.g., via system center configuration managers) to set and control aspects of the backup and restore process for one or more computers. One or more embodiments of ARMOR described herein may have applications and functionalities beyond ransomware mitigation, including, for instance, forensic analysis and litigation holds. A skilled artisan will appreciate that the journaling capabilities of embodiments of ARMOR provide a history of all actions that have occurred for a set period of time, and preserve this history in hardware outside the purview of a computer operating system. This is beneficial for forensic and law enforcement investigations, in which data and/or evidence must be preserved for analysis. Further, embodiments of ARMOR can prevent deletion of data by journaling all writes, which can later be retrieved securely without user intervention or knowledge.

ARMOR on Computing Devices

In at least one embodiment of ARMOR, (e.g., embodiments that utilize the FPGA design described above herein) one or more applications and/or middleware (referred to herein as "ARMOR Applications") are installed on a computing device to monitor communications and operations between the computing device and a data storage device (e.g., SSD).

Figure 10:
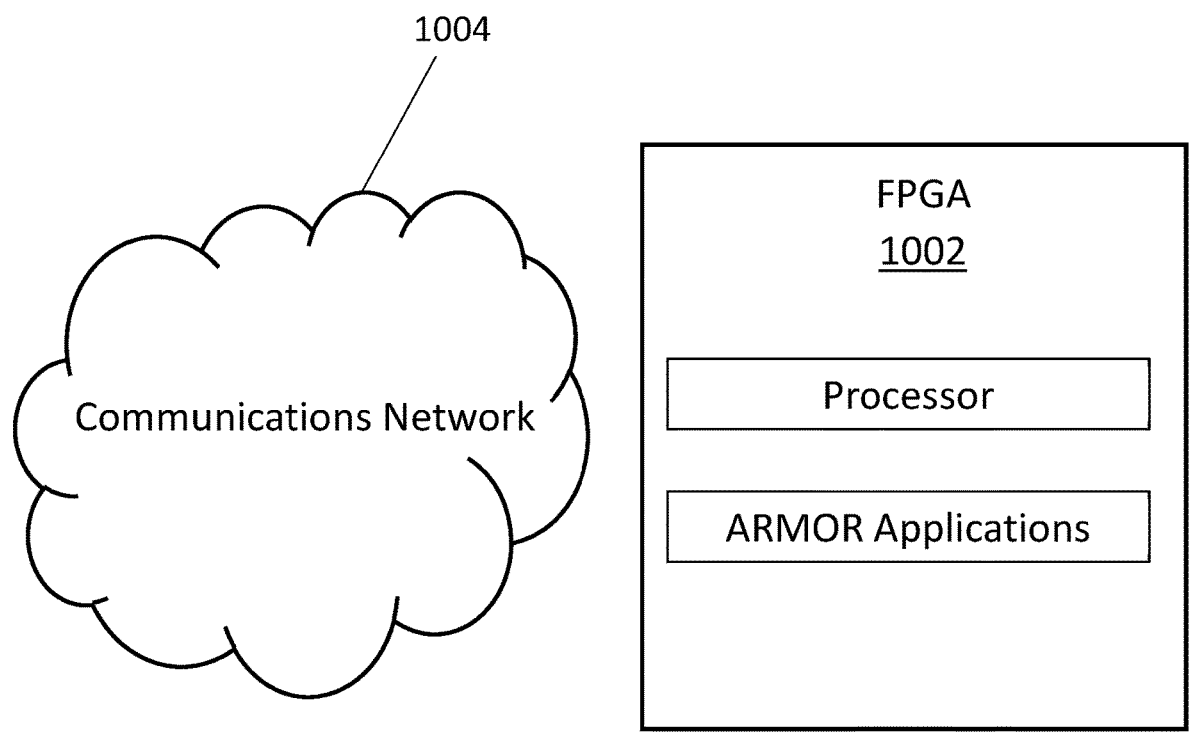
FIG. 10 is a block diagram of one or more computing devices with ARMOR installed, according to at least one embodiment of the present disclosure.

Turning now to FIG. 10, the computing device, such as an FPGA 1002, may further be connected to a communications network 1004, which can be the Internet, an intranet, or another wired or wireless communications network. For example, the communications network 1004 may include a Mobile Communications (GSM) network, a code division multiple access (CDMA) network, 3rd Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The FPGA 1002 includes at least one processor to process data and memory to store data. The processor processes communications, builds communication relationships, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the FPGA 1002 may further include at least one communications interface to transmit and receive communications, messages, and/or signals.

Thus, information processed by the FPGA 1002, or by ARMOR and/or one or more ARMOR Applications, may be sent to another computing device, such as a remote computing device, via the communications network 1004. As a non-limiting example, information relating to malicious encryption or malicious writes may be sent to one or more other computing devices.

Figure 11:
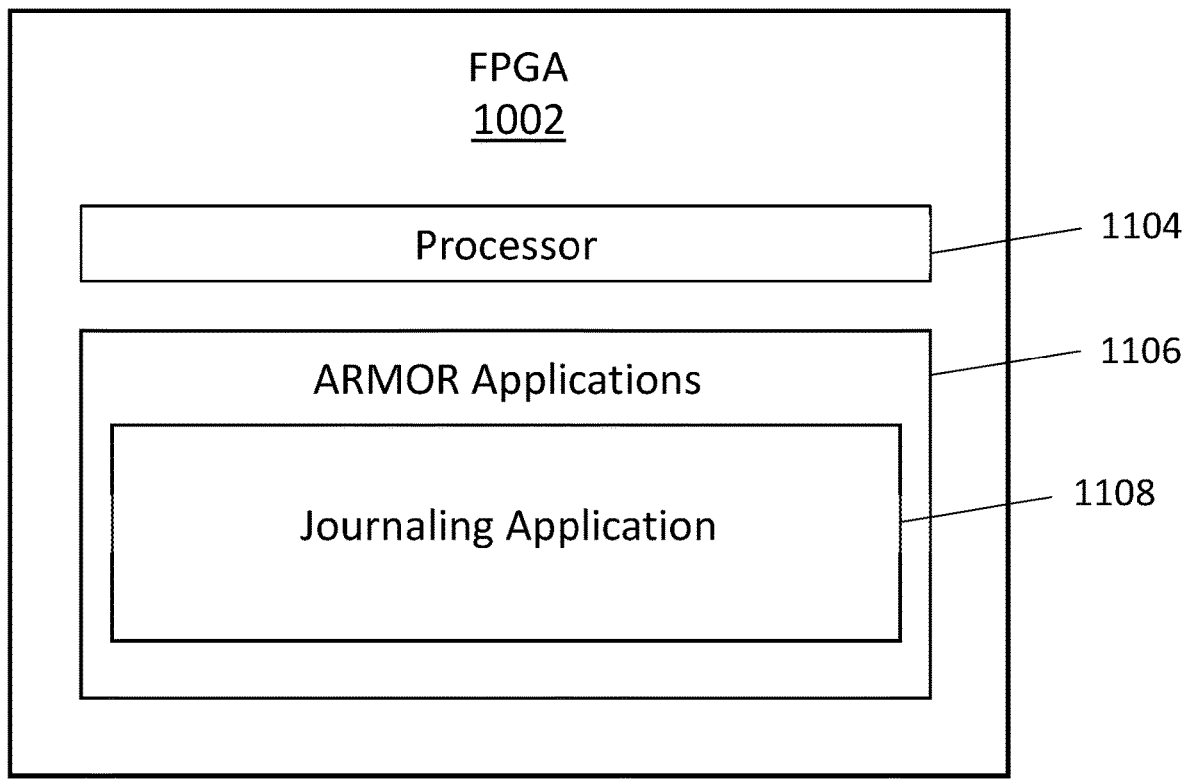
FIG. 11 is a block diagram of a computing device with ARMOR and one or more components thereof, according to at least one embodiment of the present disclosure.

FIG. 11 illustrates a block diagram of an FPGA 1002 according to an example embodiment. The FPGA 1002 includes an embedded processor 1104 and one or more ARMOR Applications 1106. Such applications may include, for instance, journaling application 1108 that performs the journaling operations and/or functions described above herein.

Ransomware Detection and Mitigation on USB Devices

Figure 14:
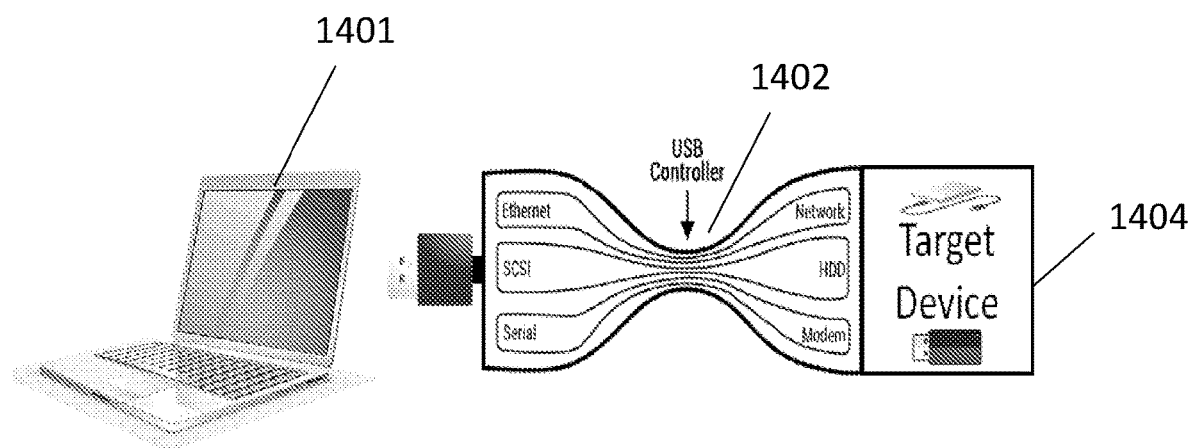
FIG. 14 is a high-level diagram of an implementation architecture, according to at least one embodiment of the present disclosure.

In at least one embodiment, the ransomware mitigation methods, devices, and/or systems described herein can be applied to (e.g., ported to) USB device firmware, thereby providing a portable ransomware mitigation solution, as shown in the high-level architecture diagram of FIG. 14. The ransomware mitigation methods, devices, and/or systems can reside in firmware at 1402 on target device 1404, thereby protecting the connected computing device 1401.

Figure 12:
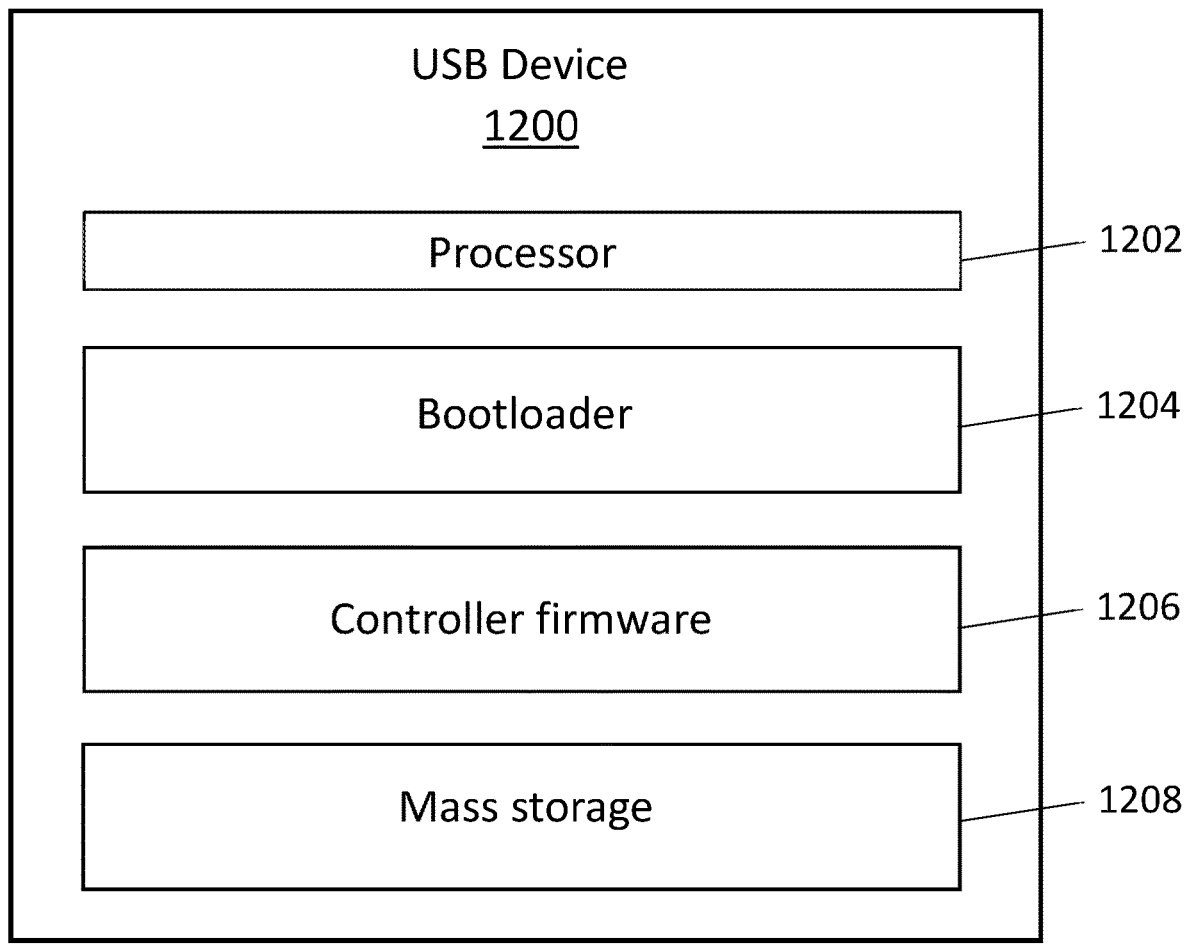
FIG. 12 is a block diagram of a universal serial bus (USB) device, according to at least one embodiment of the present disclosure.

A skilled artisan will recognize that USB hard drives and/or thumb drives provide the vast majority of portable storage for the computer industry today. Both devices have similar architectures including, for example, a USB device controller that implements low-level protocols, a hardware controller and associated firmware that manages where and how data is stored, and the mass storage media where data is stored. A block diagram of a such a USB device 1200 is shown in FIG. 12. The device comprises a controller, a central processing unit (CPU) or processor 1202, a bootloader 1204, controller firmware 1206, and mass storage 1208 (which is the only portion visible to a user). Incorporating intelligence into a USB device firmware provides a powerful generic solution that is capable of protecting both Solid State Disks (SSDs) and Hard Disk Drives (HDDs). One of skill in the art will recognize that HDDs still account for more than 50% of the storage market and are frequently used in entry level computers and portable hard drives. Thus, SSD and HDDs are important components that need protection from ransomware. In addition, adding intelligence to the USB device firmware can provide additional security features, such as, for instance, encryption of data streams and prevention of malicious actions, which is not possible using flash firmware.

The USB (universal serial bus) specification defines the protocols used in communication between a host machine and a device across a serial bus. When a USB device is plugged into a host machine, the host initiates an enumeration process that identifies the device and loads drivers on its behalf. During this procedure, the device reports hardware information (e.g., product ID, vendor ID) and supported configurations, and requests a specific configuration and set of device interfaces (e.g., Storage, Human Interface, etc.).

Based on this information, the host USB controller loads and configures the appropriate drivers for the device to function. After the normal USB enumeration, the corresponding storage class driver is loaded as a glue layer between the lower USB transportation layer and the higher block layer. The USB mass storage protocol provides support for a subset of Small Computer Systems Interface (SCSI) commands. These commands provide a framework for obtaining information about a storage device, controlling the device's operation, and reading and writing blocks of data in the storage media. When a USB mass storage device is connected, the host starts scanning the SCSI logical unit numbers (LUNs) on the device, which collects the corresponding filesystem information before the device or partition can be mounted correctly.

To augment USB device firmware to offer ransomware protection and mitigation, at least one embodiment of the disclosure searches for typical malicious access patterns commonly found in ransomware (e.g., as shown in FIG. 2) to see if encrypted blocks are then written. When malicious acts are detected, the target block(s) can be saved for later restoration. Additional information such as, for instance, unique computer system identification, can also be gathered and stored with the block to provide forensic evidence for later analysis and attribution. See also Bates, Adam M., et al., "Leveraging USB to Establish Host Identity Using Commodity Devices," NDSS, 2014.

Figure 13:
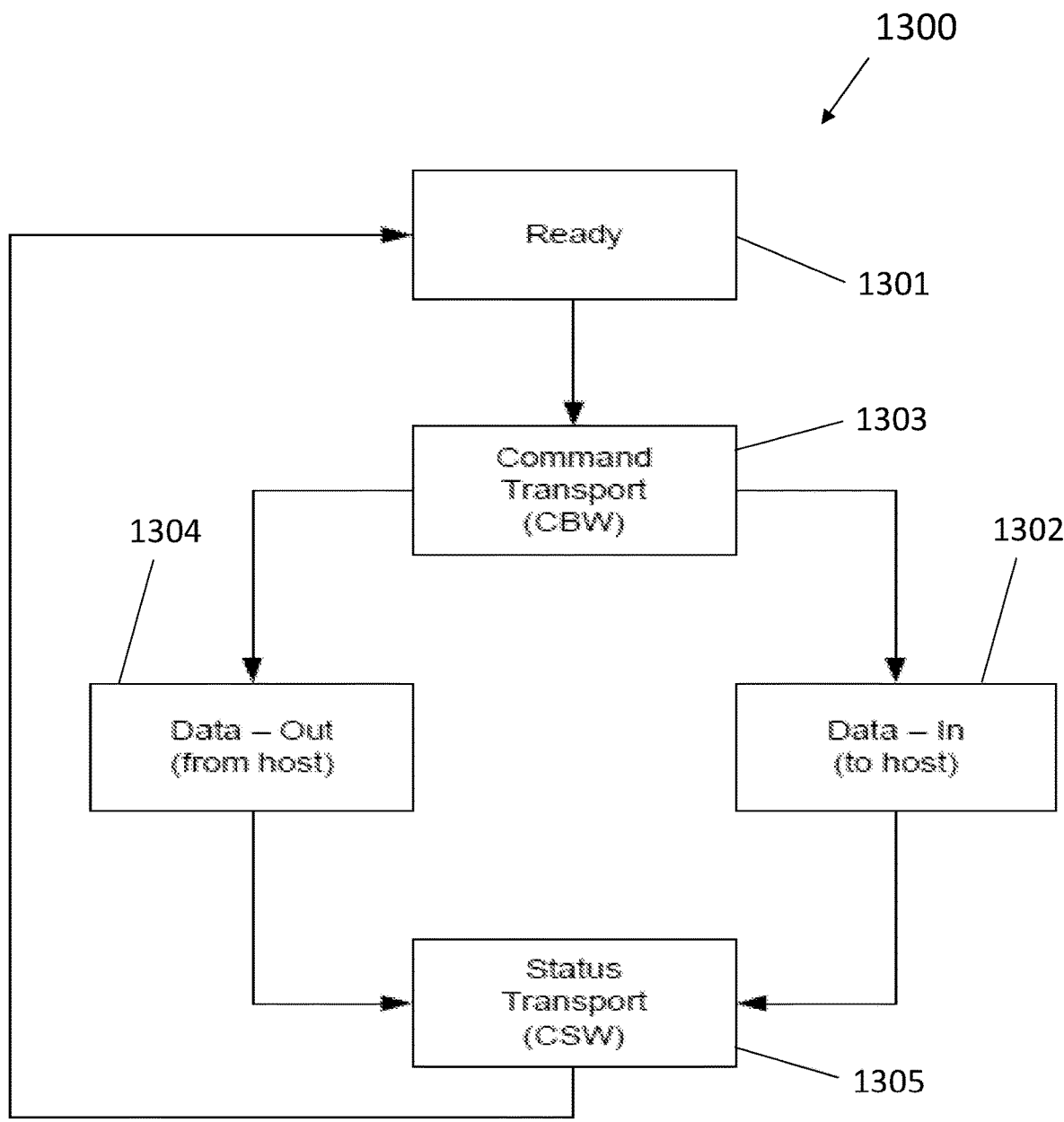
FIG. 13 is a diagram of a command interpreter state machine for a USB device firmware, according to at least one embodiment of the present disclosure.

As the USB bus is a single master bus, each data transfer is initiated by the USB host (e.g., server, desktop, laptop, etc.). The sole purpose of the USB device is to respond to commands and queries from the host. To do this, the USB device firmware has a command interpreter state machine, as shown in further detail in FIG. 13. This is the location in the firmware where, in an embodiment of the disclosure, code for a ransomware mitigation process is added. The command interpreter state machine 1300 includes a ready state 1301, Command Block Wrapper (CBW) 1303, Command Status Wrapper (CSW) 1305, and data-in 1302 and data-out 1304 operations. Thus, in the command interpreter state machine 1300, the ransomware mitigation process can provide additional checks into the data-in 1302 and data-out 1304 operations. Storage space for custom software, such as, for instance, the aforementioned ransomware mitigation process, is generally available in USB device firmware. See, e.g., Silicon Labs USB Mass Storage Device Reference Design Programmer's Guide, available at the silabs.com website as the "AN282" application note.

Ransomware typically reads information from disk before encryption and overwrite or deletion operations. Thus, if a block has been read (e.g., via tracking read requests) and then is written to, it could be an indication of a malicious ransomware action. To more accurately track and protect against malicious encryption actions, read and write requests must be evaluated for encryption using chi-squared and serial correlation techniques, as discussed previously herein. Detected read-encrypt-overwrite and read-encrypt-write-delete operations result in the saving of the original block to a hidden partition or reserved blocks to provide a mechanism for future recovery. Timestamps can also be recorded to allow the oldest saved data to be reclaimed for storage purposes after a threshold time period has passed.

At least one embodiment of the disclosure comprises a recovery module that provides the user with simple and intuitive tools to recover original files after a ransomware attack. Unlike state-of-the-art processes (see, e.g., Wang, Peiying, et al., "MimosaFTL: Adding Secure and Practical Ransomware Defense Strategy to Flash Translation Layer," Proceedings of the Ninth ACM Conference on Data and Application Security and Privacy, ACM, 2019) where a user must manually verify the correct file version and contents, the ransomware mitigation methods, devices, and/or systems described herein know which blocks are maliciously encrypted by reading source and destination data buffer contents. Therefore, such ransomware mitigation methods, device, and/or systems can precisely restore original data without user intervention. When executed, the recovery module queries the USB device using reserved SCSI commands (e.g., 0x60 to 0x7F) to locate and extract all the blocks that have been marked as saved. Reserved SCSI commands are used so that other SCSI commands (e.g., data I/O) are not disrupted. The timestamp, block address, and number of blocks is then used to reconstruct the original data. In order to maintain data locality for performance reasons, modern file systems usually manage the logical address space in a contiguous manner, and also buffer storage operations to exploit temporal and spatial locality. With these insights, the recovery mechanism sorts the saved blocks with their addresses and timestamps to reconstruct the original data.

In summary, embodiments of the disclosure described herein provide a highly effective end-to-end technology solution that mitigates the threat of ransomware across a wide range of devices including, for instance, servers, storage systems (e.g., cloud storage), computers, and other portable storage devices (e.g., smartphones, tablets, USB devices, etc.).

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A non-transitory computer-readable storage medium, having instructions stored thereon that, when executed by a computing device, cause the computing device to perform operations, the operations comprising:
    monitoring requests to write data, wherein the requests to write data are interpreted as operations performed on a plurality of files;
    identifying at least one of (i) unauthorized encryption of at least one file in the plurality of files in the requests to write data, (ii) unauthorized deletion of the at least one file and (iii) detection of malicious activity;
recording the requests to write data to a journal stored on a storage device;
recording, in the journal, location and content of the plurality of files;
restoring, when the unauthorized encryption is identified, the at least one file from the journal,
wherein the identifying further comprises:
  detecting, by a change detection algorithm, changes to the one or more files;
wherein the detecting further comprises:
  monitoring a first portion of a data stream and a second portion of the data stream, wherein the first portion corresponds to a start of the data stream, and
wherein the second portion corresponds to a variable section of the data stream;
  calculating a test statistic d that quantifies closeness of distribution of the data;
  reporting, at a point in the data stream when the test statistic d is greater than a change value α, a change in the data stream;
  resetting the start of the data stream to the point; and
  for the first portion having values X1 and the second portion having values X2, and for each segment A of real numbers:
    calculating a fraction of values in X1 that fall in A, denoted S1(A);
    calculating a fraction of values in X2 that fall in A, denoted S2(A); and
    calculating a Φ value according to a formula:

$$\frac{|S_1(A) - S_2(A)|}{\sqrt{\min\left\{\frac{S_1(A) + S_2(A)}{2}, \left(1 - \frac{S_1(A) + S_2(A)}{2}\right)\right\}}}.$$

2. The non-transitory computer-readable storage medium of claim 1, the identifying further comprising:
calculating, by serial correlation, one or more encryption scores.

3. The non-transitory computer-readable storage medium of claim 1, the detecting further comprising:
defining the change value α by:
  generating a plurality of the data streams;
  calculating a maximum entropy value for each of the plurality of the data streams; and
  calculating a percentile of the maximum entropy values.

4. The non-transitory computer-readable storage medium of claim 1, wherein the non-transitory computer-readable storage medium can be selected from the group consisting of: universal serial bus (USB), small computer system interface (SCSI), serial advanced technology attachment (SATA), Institute of Electrical and Electronics Engineers (IEEE) 1394, Non-Volatile Memory Express (NVME), Peripheral Component Interconnect Express (PCI Express).

5. The non-transitory computer-readable storage medium of claim 1, wherein the operations operate independently of operating system functions and libraries on the computing device.

6. The non-transitory computer-readable storage medium of claim 1, wherein the operations operate independently of communications with any other computing devices or any other networks.

7. The non-transitory computer-readable storage medium of claim 1, the operations further comprising:
prompting, in response to identification of the unauthorized encryption, a user to recover the at least one file from the journal.

8. A computer hardware interface comprising:
a multiplexer;
a host interface designed to communicate with a data storage device;
a device interface designed to communicate with a computing device;
a main information pathway connecting the host, the multiplexer, and the device;
a journaling logic executed by a computing device;
a journaling path connected to the main information pathway and to the journaling logic, wherein the journaling path forwards traffic on the main information pathway to the journaling logic,
wherein the journaling logic:
  detects malicious actions and malicious encryption actions,
wherein the detection comprises:
  monitoring a first portion of a data stream and a second portion of the data stream, wherein the first portion corresponds to a start of the data stream, and wherein the second portion corresponds to a variable section of the data stream;
  calculating a test statistic d that quantifies closeness of distribution of the data;
  reporting, at a point in the data stream when the test statistic d is greater than a change value α, a change in the data stream;
  resetting the start of the data stream to the point; and
  for the first portion having values X1 and the second portion having values X2, and for each segment A of real numbers:
    calculating a fraction of values in X1 that fall in A, denoted S1(A);
    calculating a fraction of values in X2 that fall in A, denoted S2(A); and
    calculating a Φ value according to a formula:

$$\frac{|S_1(A) - S_2(A)|}{\sqrt{\min\left\{\frac{S_1(A) + S_2(A)}{2}, \left(1 - \frac{S_1(A) + S_2(A)}{2}\right)\right\}}}.$$

9. The computer hardware interface of claim 8, wherein the journaling logic is further configured to control the multiplexer to switch between (i) sending data to the data storage device and sending the data to a backup or secondary storage device, or (ii) sending the data from the backup or secondary storage device to the primary storage device.

10. The computer hardware interface of claim 8, wherein the journaling logic
monitors requests to write data, wherein the requests to write data are interpreted as operations performed a plurality of files;
identifies unauthorized encryption of at least one file in the plurality of files in the requests to write data;
records location and content of the plurality of files;
restores one or more files in the plurality of files.

11. The computer hardware interface of claim 10, wherein the journaling application restores the at least one file when the unauthorized encryption is identified.

12. The computer hardware interface of claim 8, wherein the journaling logic further journals all write operations to collect forensic evidence, data related to one or more law enforcement investigations, and litigation information, and wherein the computer hardware interface provides secure remote control.

13. A method for mitigating malicious software attacks, the method comprising:
- monitoring an information stream passing between a computing device, a multiplexer, and a primary data storage device;
- forwarding one or more files in the information stream to a journal located on a separate data storage or the primary data storage device;
- saving location and content of the one or more files;
- identifying when the one or more files are subject to a malicious encryption attempt;
- controlling, when the malicious encryption attempt is identified, the multiplexer to stop sending data in the information stream to the data storage device and to start sending the data to the journal; and
- sending, when the malicious encryption attempt is identified, the location and content of the one or more files from the journal to the data storage device, thereby restoring the one or more files,
- wherein the identifying further comprises:
  - detecting, by a change detection algorithm, changes to the one or more files;
- wherein the detecting further comprises:
  - monitoring a first portion of the information stream and a second portion of the information stream, wherein the first portion corresponds to a start of the information stream, and wherein the second portion corresponds to a variable section of the information stream,
  - calculating a test statistic d that quantifies closeness of distribution of the information,
  - reporting, at a point in the information stream when the test statistic d is greater than a change value α, a change in the information stream,
  - resetting the start of the information stream to the point; and
  - for the first portion having values X1 and the second portion having values X2, and for each segment A of real numbers:
    - calculating a fraction of values in X1 that fall in A, denoted S1(A);
    - calculating a fraction of values in X2 that fall in A, denoted S2(A);
  - and
    - calculating a Φ value according to a formula:

$$\frac{|S_1(A) - S_2(A)|}{\sqrt{\min\left\{\frac{S_1(A) + S_2(A)}{2}, \left(1 - \frac{S_1(A) + S_2(A)}{2}\right)\right\}}}.$$

14. The method of claim 13, wherein the journal is located on a separate data storage.

15. The method of claim 13, wherein a change detection algorithm is used to identify when the one or more files are subject to the malicious encryption attempt, and wherein the change detection algorithm performs operations comprising:
- calculating a change statistic based on entropy, chi-squared, or serial correlation of values of files written over time,
- comparing the change statistic to a threshold value,
- reporting that a change has occurred when the change statistic has a value above the threshold value, thereby identifying the malicious encryption attempt.

16. The method of claim 13, wherein serial correlation values are used to identify when the one or more files are subject to the malicious encryption attempt.

17. The method of claim 13, further comprising:
- prompting, when the malicious encryption attempt is identified, a user to initiate restoration of the one or more files.

18. The method of claim 13, wherein the computing device comprises at least one Serial Advanced Technology Attachment (SATA) or Non-Volatile Memory Express (NVME) controller.

19. The method of claim 18, wherein the at least one SATA or NVME controller is implemented via (i) a Field Programmable Gate Array (FPGA), (ii) an ASIC (Application Specific Integrated Circuit), or (iii) a processor of the primary data storage device.

* * * * *